United States Patent
Thi et al.

(10) Patent No.: US 12,148,259 B1
(45) Date of Patent: Nov. 19, 2024

(54) SYSTEM TO DETERMINE USER GROUPINGS AT A PORTAL

(71) Applicant: AMAZON TECHNOLOGIES, INC., Seattle, WA (US)

(72) Inventors: Hue Tuan Thi, Seattle, WA (US); Xiaoxia Shi, Seattle, WA (US); Chris Broaddus, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/304,128

(22) Filed: Jun. 15, 2021

(51) Int. Cl.
  *G07C 9/28*   (2020.01)
  *G06F 18/20*  (2023.01)
  *G06Q 20/20*  (2012.01)
  *G06T 7/70*   (2017.01)
  *G06V 20/52*  (2022.01)
  *G07C 9/00*   (2020.01)
  *G07C 9/25*   (2020.01)
  *G07C 9/30*   (2020.01)

(52) U.S. Cl.
  CPC ............ *G07C 9/28* (2020.01); *G06F 18/285* (2023.01); *G06Q 20/20* (2013.01); *G06T 7/70* (2017.01); *G06V 20/52* (2022.01); *G07C 9/00563* (2013.01); *G07C 9/00904* (2013.01); *G07C 9/253* (2020.01); *G07C 9/30* (2020.01); *G07C 2209/64* (2013.01)

(58) Field of Classification Search
  CPC .. G07C 9/28; G07C 9/00563; G07C 9/00904; G07C 9/253; G07C 9/30; G07C 2209/64; G07C 9/25; G06F 18/285; G06Q 20/20; G06T 7/70; G06V 20/52
  See application file for complete search history.

(56) References Cited

U.S. PATENT DOCUMENTS

| | | | |
|---|---|---|---|
| 5,666,157 | A | 9/1997 | Aviv |
| 5,875,305 | A | 2/1999 | Winter et al. |
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |

(Continued)

OTHER PUBLICATIONS

Asthana, et al., "An Indoor Wireless System For Personalized Shopping Assistance", 6 pages. Retrieved from the Internet: URL: https://www.csd.uwo.ca/~hlutfiyy/Perv/Papers/asthana94indoor.pdf.

(Continued)

*Primary Examiner* — Michael E Teitelbaum
(74) *Attorney, Agent, or Firm* — Lindauer Law, PLLC

(57) ABSTRACT

Users may enter and exit a facility as individuals, or as groups in which an authorized user sponsors other users. Within the group, actions within the facility taken by those sponsored users may be associated with the account of the authorized user. Sensor data acquired at a portal area is used to determine information about users passing through a portal, such as a crossing time, a distance from a crossing point, and so forth. This information is used to determine group associations. These group associations are resilient to situations, such as employees who have exited and re-entered with a user, employees holding open a gate for a user, people entering ahead of the authorized user, people entering after the authorized user, people exiting before an authorized user, and so forth.

18 Claims, 8 Drawing Sheets

(56) References Cited

U.S. PATENT DOCUMENTS

| | | | |
|---|---|---|---|
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 10,007,892 | B1 | 6/2018 | Hahn et al. |
| 2011/0011936 | A1 | 1/2011 | Morandi et al. |
| 2011/0032353 | A1 | 2/2011 | Vallone et al. |
| 2012/0180103 | A1 | 7/2012 | Weik et al. |
| 2012/0284132 | A1 | 11/2012 | Kim et al. |
| 2013/0284806 | A1 | 10/2013 | Margalit |
| 2014/0019241 | A1 | 1/2014 | Treiser et al. |
| 2015/0086107 | A1 | 3/2015 | Dedeoglu et al. |
| 2016/0055692 | A1 | 2/2016 | Trani |
| 2016/0323274 | A1 | 11/2016 | Chandrasekaran et al. |
| 2017/0277957 | A1* | 9/2017 | Tonoike ................. G06V 20/52 |
| 2019/0026560 | A1* | 1/2019 | Nishikawa ................ G06T 7/70 |

OTHER PUBLICATIONS

Kalnikaite, et al., "How to Nudge In Situ: Designing Lambent Devices to Deliver Salient Information in Supermarkets", UbiComp'11, Sept. 17-21, 2011, Beijing, China, pp. 11-20. ACM 2011.Retrieved from the Internet: URL: http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

Vu, et al., "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

* cited by examiner

US 12,148,259 B1

SYSTEM TO DETERMINE USER GROUPINGS AT A PORTAL

BACKGROUND

Facilities such as stores, libraries, hospitals, offices, and so forth, may need the ability to identify users in the facility who are associated with one another.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
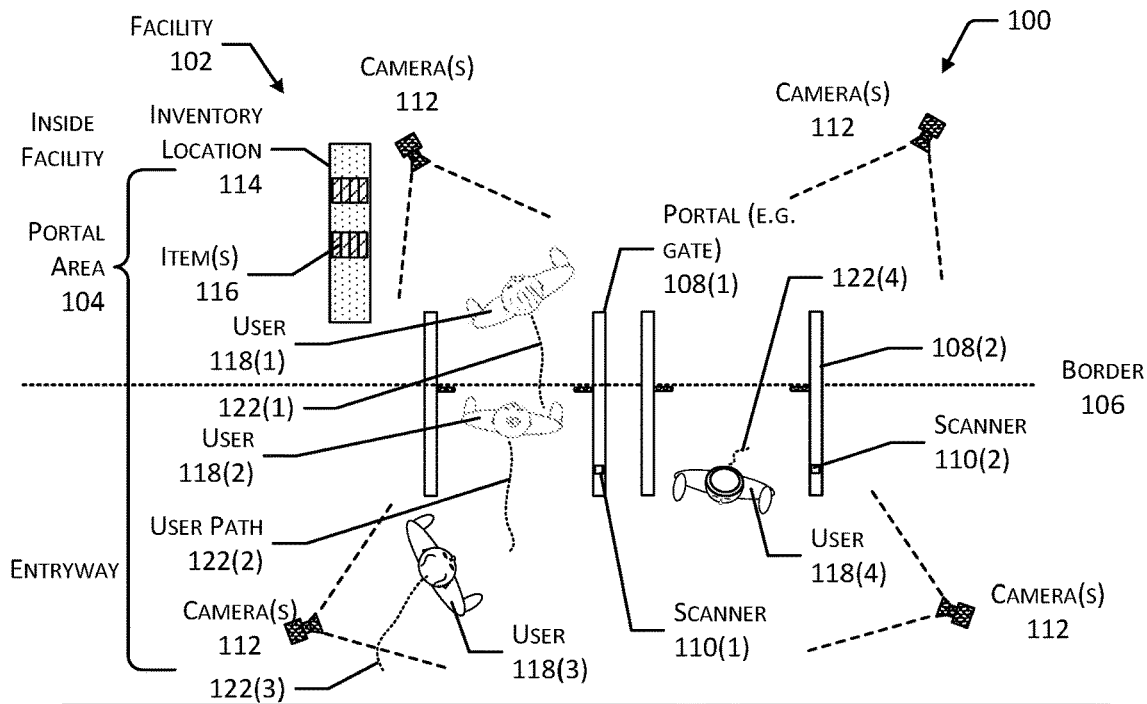
FIG. 1 illustrates a system to determine whether users at a facility are part of a group, according to some implementations.
Figure 1:
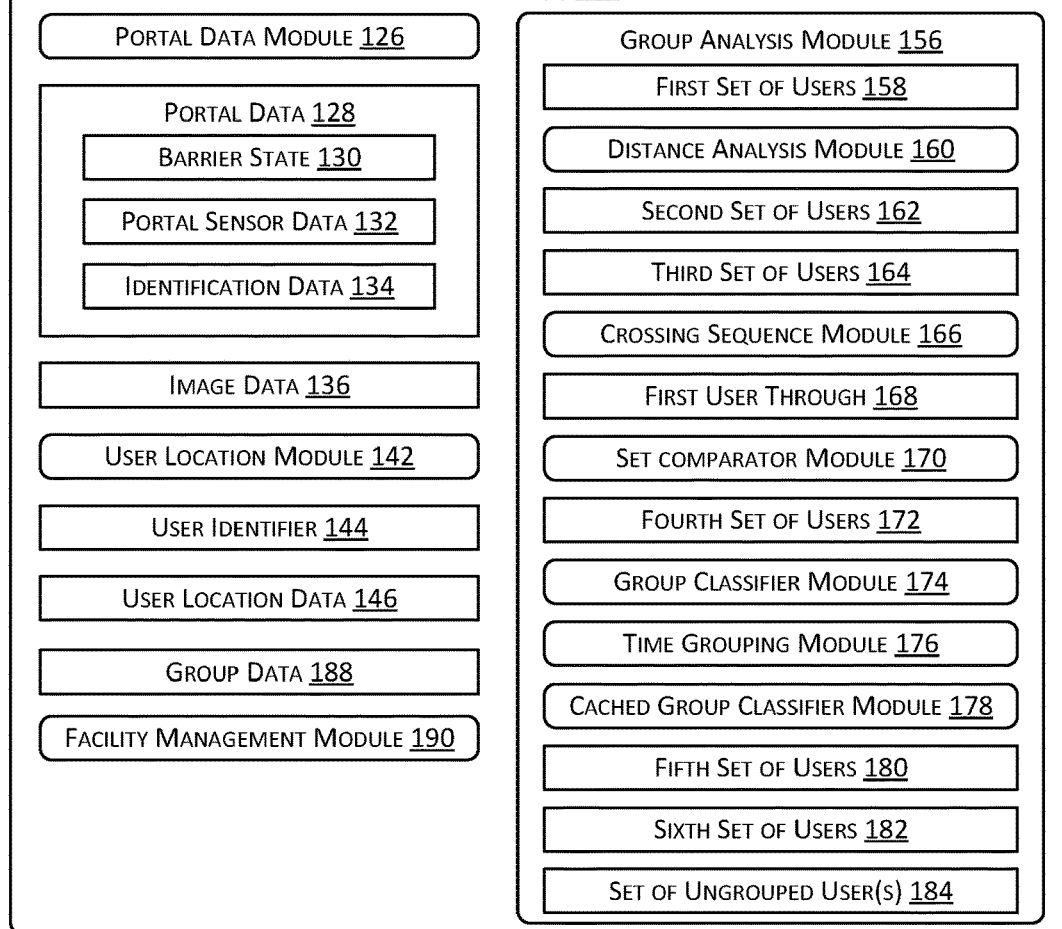

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A facility may maintain information about users within the facility. This information may be used to determine if a user entering or exiting the facility is an authorized user or unauthorized user, associate interactions taken by the user with a particular account, and so forth. An authorized user may comprise a user who has previously set up a payment account with the facility or an associated system, or who completes setup of the payment account at a later time. In comparison, an unauthorized user may comprise a user who has no valid payment account with the facility or the associated system. An authorized user may bring someone with them to the facility. For example, the authorized user may bring a friend, colleague, child, and so forth to a material handling facility. The authorized user and the guest user may be associated with one another, forming a group. The actions of group members may be attributed to or associated with the account of the authorized user. Continuing the example, the friend of the authorized user may pick an item, resulting in the account of the authorized user being billed for that item.

One technique for determining members of a group is to strictly enforce a "one scan, one user enters" procedure during entry, exit, or both. This technique may fail to properly determine group membership in various situations, such as when the authorized user is carrying a child, or when one user "tailgates" or "frontgates" another. Tailgating occurs when one or more additional people follow an authorized user through a portal, such as a gate. These tailgaters may or may not be associated with the authorized user they followed. Frontgating occurs when one or more additional people precede an authorized user through the portal. These frontgaters may or may not be associated with the authorized user they preceded.

Various scenarios result in failure of the "one scan, one user enters" technique. For example, while in an entryway an employee may open a gate for a user to demonstrate how to enter the facility. That employee may encourage the user to pass through the gate, and the employee may then immediately exit the facility to return to the entryway. In another example, as a courtesy someone may hold a gate open to allow another user to pass through.

Described in this disclosure are various techniques and systems that may be used to determine group data that is indicative of whether two or more users of a facility are associated with one another as a group. During entry or exit, users may pass through a portal. Users may exit or enter the facility through the portal. The portal may comprise an open passage, gate, turnstile, door, and so forth.

One or more sensors associated with the portal, such as within a gate, on a pedestal, and so forth may be used to acquire portal data. The portal data may include identification data presented by the user, information indicative of when a barrier was open, data indicative of a count of people determined to have passed the gate while the barrier was open, and so forth. For example, the portal may include a scanner with a camera, and the identification data may comprise an image of a user's palm, an image of a smartphone presenting a machine-readable code, an image of an identification card, and so forth. The system may or may not consider whether the identification data is valid and authorized prior to entry of the user. For example, a user with expired or incorrect identification data may still be permitted to enter the facility.

Other sensors, such as cameras, radio receivers, and so forth in the facility acquire sensor data. For example, cameras at the facility may acquire image data of a portal area that includes one or more portals. This image data may be processed to determine presence of a user, location of the user at a given time, crossing time indicative of when the user passed a specified border, count of users who passed the border, and so forth.

The sensor data is processed to determine information about the users with respect to a portal area and determine group data. The group data may indicate that a user is solo, or with others. Once the group data has been determined, interactions in the facility that are attributed to members of a group may be associated with a specified account. For example, the specified account may be billed for items removed from the facility by other members of the group.

User location data indicative of a location of individual users at or near the portal and elsewhere within the facility may be determined using image data from cameras. Each user may be assigned a user identifier. The user identifiers distinguish one user in the facility at that time from another user and are not necessarily indicative of a definitive unique identity. For example, the user identifiers may be serial numbers that are assigned in sequential order, regardless of the actual identity of the user they represent.

Group data may be generated that is indicative of whether the first user identifier is associated with the second user identifier. This determination may be based on sets of users at various locations or times, distance between a user and the portal during a specified interval of time, relative order of passage, time of entry relative to acquisition of identification data, and so forth. Based on these techniques the system is able to determine group members while avoiding inadvertent inclusion of loiterers, solo attendees, or members of other groups.

Once group data has been determined, other interactions within the facility may be attributed to an appropriate account. For example, as the authorized user and their guest travel through the facility, when the guest picks an item and they leave the facility, the account associated with the authorized user may be billed for the item.

The techniques and systems described in this disclosure offer significant technological improvements. Compared to previous systems that required strict adherence to "one scan, one person", the systems described herein allow for an automated system to efficiently and accurately identify groups of users in a dynamically changing environment without human intervention. This significantly increases the number of users who may pass through an entry in a given amount of time, allowing either the use of fewer portals or allowing more users to use the facility. In addition, other systems involved in managing the facility realize significant improvements in data quality and operation by having at least one account associated with each user within the facility. Also, the techniques and systems described herein allow guests of an authorized user to enter the facility without necessarily being enrolled in the system, while still providing at least a substantial portion of the functionality normally afforded to authorized users without hindrance. For example, an authorized user may bring a guest to the facility. While at the facility, the guest may use the facility subject to the permissions afforded to the authorized user, without the need for any special steps that may slow down or otherwise impede entry. In comparison, traditional techniques may have involved the user and their guest using a special entry process, such as stopping at a security desk to receive temporary credentials, and so forth.

The techniques and systems also support reliable group association in situations that would otherwise fail due to common behaviors, such as one user holding open a barrier for another, an employee demonstrating use of the system, and so forth. For example, by reliably recognizing that an employee is not a member of a group, the system is able to more quickly and accurately finalize a transaction once the last member of the group leaves the facility, rather than waiting for the employee to leave. By accurately determining a group that a user is a member of, the resulting transactional data associated with that interaction is substantially improved. For example, interactions such as a member of a group removing an item for purchase are associated with the proper group, and thus the proper account is billed for that item.

ILLUSTRATIVE SYSTEM

FIG. 1 illustrates a system 100 to determine whether users at a facility are part of a group, according to some implementations. A facility 102 includes one or more portal areas 104 and associated borders 106. A relative location with respect to the border 106 determines whether a user 118 is in an entryway or inside the facility 102 or a portion thereof. The portal area 104 includes one or more portals 108. In one implementation, users 118 may enter and exit through a given portal 108. For example, a portal 108 may be bidirectional.

In some implementations, the portal 108 may include a movable barrier to control movement of users 118. For example, the portal 108 may include computer-controlled panels that may be closed to impede passage of the user 118 or opened to permit passage of the user 118. The portal 108 may include one or more of a scanner 110 or other sensor. For example, the scanner 110 may be placed in a pedestal or console on one side of the portal 108, and comprise a camera.

The facility 102 may include cameras 112. Some of these cameras 112 may have their respective fields of view directed towards inventory locations 114. The inventory locations 114 may include one or more of a platform, a rack, a case, a cabinet, a bin, a floor location, or other suitable storage mechanisms for holding, supporting, or storing items 116.

During use, a user 118 may approach the portal 108 and present to the scanner 110 something that is used to provide identification data. For example, if the identification data is based on biometric information, the scanner 110 may obtain an image of the user's 118 hand or portion thereof. In another example, the identification data may be obtained from a machine-readable code that is presented on a display of a smartphone that the user 118 presents to the scanner 110. In yet another example, the identification data may be obtained from a pre-printed card that the user 118 presents to the scanner 110. In other implementations, the scanner 110 may comprise a radio-frequency identification (RFID) reader, Bluetooth transceiver, and so forth.

The users 118 may include humans, robots, or both. For example, the user 118 may go to the facility 102, bringing a robot to assist them.

The user 118 passes through the portal 108 into the facility 102. While in the facility 102, the user 118 may utilize a cart. The user 118 may move about the facility 102, with those movements indicated in this illustration by a user path 122. The user 118 may pick items 116 from the inventory locations 114 and place them in the cart, or return items 116 to the inventory locations 114. Eventually, the user 118 concludes their visit and leaves the facility 102 by passing through the portal 108. In some implementations, a single portal 108 may operate as both an entry and an exit at the same time. For example, users 118 may enter and exit through portal 108(1). In other implementations, a portal 108 may operate as an entry at one time, and an exit at another time. For example, during peak hours more portals 108 may be designated as entry only to allow more users 118 to enter. Users 118 may enter and exit the facility 102 using the same or different portals 108. For example, as depicted here, user 118(1) may enter through portal 108(1) and exit through portal 108(2).

In this illustration four users 118(1)-(4) are depicted. For the sake of illustration, and not necessarily as a limitation, user 118(1) is alone, user 118(2) is an authorized user with user 118(3) as a guest, and user 118(4) is an employee. One or more servers 124 may perform the various operations described below.

A portal data module 126 may receive data associated with operation of the portal area 104. The portal data module 126 produces portal data 128 that may include one or more of barrier state 130, portal sensor data 132, or identification data 134. In implementations where the portal 108 is so equipped, the barrier state 130 may comprise data indicative of whether a movable barrier at the portal 108 is open or closed at particular times. The portal sensor data 132 may comprise data from sensors at the portal 108 such as proximity sensors, optical sensors, a torque sensor for the moveable barrier, and so forth. For example, the portal sensor data 132 may comprise data obtained by a proximity sensor that is indicative of presence of an object at the portal 108. In another example, based on data from the torque sensor, the portal sensor data 132 may indicate that the moveable barrier encountered an obstruction while attempting to close. In some implementations, the portal data 128 may be indicative of when a user 118 entered the facility 102.

The scanner 110 at the portal 108, or elsewhere at the portal area 104, produces identification data 134. For example, if the scanner 110 comprises a camera, the identification data 134 may comprise image data that depicts at least a portion of a hand, a display of an electronic device, a pre-printed card, and so forth. In another example, if the scanner 110 comprises a near field communication (NFC) reader, the identification data 134 may comprise information obtained from an NFC tag presented by the user 118. The identification data 134 may include information indicative of a time at which the data was acquired.

Within the facility 102, one or more cameras 112 may have fields of view that include at least a portion of the portal area 104 and generate image data 136. For example, cameras 112 may be arranged to acquire images from overhead and at an oblique angle. Image data 136 may be obtained from other locations throughout the facility 102. In some implementations, cameras 112 may be arranged around an exterior of the facility 102. For example, cameras 112 may be arranged to acquire image data 136 of users 118 as they approach the portal area 104, in the parking lot, and so forth. In some implementations, the image data 136 may be used to determine a crossing time of the user 118 to the facility 102. The crossing time may be specified as the time at which the user 118 passed the border 106 and was subsequently inside the facility 102.

A user location module 142 may use one or more of the image data 136 or data from other sensors during operation. The user location module 142 may assign a user identifier 144 to each user 118 in the facility 102 and generate user location data 146 that is indicative of a location within the facility 102 at particular times. For example, the user location module 142 may process the image data 136 obtained by the cameras 112 at known locations and with known fields of view to determine a location of an object present in the images that is determined to be the user 118. In other implementations, other techniques may be used for determining the user location data 146.

The user location module 142 or another module may associate a user identifier 144 with each user 118. The user identifiers 144 distinguish one user 118 in the facility 102 at that time from another user 118, and are not necessarily indicative of a definitive unique identity. For example, the user identifiers 144 may be serial numbers that are assigned in sequential order, regardless of the actual identity of the user 118 they represent. In some implementations, the identification data 134 presented at the portal 108 may be used to authenticate and affirmatively identify a particular user 118. For example, if the scanner 110 acquires an image of at least a portion of the user's 118 hand to perform biometric identification, the user identifier 144 subsequently assigned to that user 118 may be associated with that particular identity.

A group analysis module 156 may use the data from one or more of the above modules to determine group data 188. The group data 188 comprises information that may indicate whether one user identifier 144 is associated with another user identifier 144, designate an account associated with a user 118, and so forth. For example, the group analysis module 156 may determine group data 188 that indicates user 118(3) is associated with the account of user 118(2). In another example, the group analysis module 156 may determine group data 188 that user 118(2) and 118(3) are associated with one another. In some implementations the group analysis module 156 may determine group data 188 on an ongoing basis.

The portal data 128 may indicate that one or more of the users 118(1)-118(4) presented identification data 134(2) at the portal 108(1). As described above, the user location module 142 may assign user identifiers 144(1)-(4), respectively, to the users 118(1)-(4). In this example, no identification data 134 was provided by the user 118(2) or 118(4). Crossing times are also determined associated with each of the users 118. For example, the crossing times may be based on portal sensor data 132, image data 136, and so forth. The crossing time may be indicative of a time associated with the user 118 passing the border 106 to be inside the facility 102.

The group analysis module 156 determines a first set of users 158 that are associated with the portal area 104. For example, the first set of users 158 may comprise the users 118 for which user location data 146 indicates user locations within the portal area 104. In one implementation, the first set of users 158 may include users 118 that have user locations within the portal area 104 and are inside the facility 102, within the border 106.

A distance analysis module 160 determines distance data associated with individual users 118 in the first set of users 158. In one implementation, the distance analysis module 160 may use the user path 122 associated with a particular user identifier 144. For example, the user path 122 may comprise user location data 146 during a time interval immediately following entry after passing the border 106 to enter the facility 102. This user location data 146 may be used to determine an average crossing distance that is calculated as an average of distances between the user location and a crossing location associated with the portal 108. The crossing location may be specified as a point at which the user location intersected the border 106. A maximum crossing distance may also be determined that is indicative of a maximum distance between the user location and the crossing location during the time interval. In one implementation the time interval may be 30 seconds. In other implementations, other time intervals may be used. The distance analysis module 160 may compare the average crossing distance and the maximum crossing distance to respective threshold values. Based on this comparison, a determination may be made as to whether a user 118 may be loitering near the portal 108. For example, an employee may remain near the portal 108 to assist others.

If the distances for a user 118 are greater than the thresholds, that user 118 is included in a second set of users 162. In implementations where the facility 102 is a store, the second set of users 162 are deemed likely to be customers. If the distances for the user 118 are below the thresholds, the user 118 is included in a third set of users 164. This third set of users 164 may be deemed to be possible loiterers.

A crossing sequence module 166 determines a first user through 168 the portal 108. For example, the crossing sequence module 166 may use the crossing time data to determine which user identifier 144 out of the second set of users 162 crossed the border 106 first. Continuing this example, the first user through 168 may be indicative of the first user 118 who entered the facility 102 or the first user 118 who exited the facility 102.

A set comparator module 170 is used to compare the user identifiers 144 of two or more sets of users and determine if the sets are identical. For example, the first set of users 158 may be compared to the third set of users 164. Continuing the example, if the first set and the third set do not match, the third set of users 164 may be added to a fourth set of users 172. This fourth set of users 172 may comprise possible tailgaters. Those users who were determined by the crossing sequence module 166 to not be the first user through 168 may be added to the fourth set of users 172.

A group classifier module 174 may determine a confidence value that is indicative of whether a user 118 in the fourth set of users 172 is not grouped with the first user through 168. The group classifier module 174 may implement a classifier with a logistic regression algorithm. The confidence value may result from classification of the user 118 relative to a comparison anchor, such as the first user through 168. If yes, the user 118 in the fourth set of users 172 may be added to a set of ungrouped users 184. If no, the user 118 in the fourth set of users 172 may be assessed using a time grouping module 176.

In some implementations, the time grouping module 176 may determine if the crossing time of the user 118 is less than a threshold time since the crossing time of the first user through 168. If yes, the user 118 of the fourth set of users 172 is added to a fifth set of users 180. The fifth set of users 180 may be deemed to be tailgaters of the first user through 168. If the crossing time of the user 118 is less than the threshold time since entry of the first user through 168, the time grouping module 176 adds the user 118 to a sixth set of users 182. The sixth set of users 182 are then added to the group associated with the first user through 168.

The fifth set of users 180 may then be assessed by a cached group classifier module 178. The cached group classifier module 178 may determine whether the user 118 in the fifth set of users 180 has a high confidence of being grouped with the first user through 168. If yes, the user 118 in the fifth set of users 180 is added to the sixth set of users 182 for addition to the group. If not, the user 118 in the fifth set of users 180 is added to the set of ungrouped users 184.

Figure 4A:
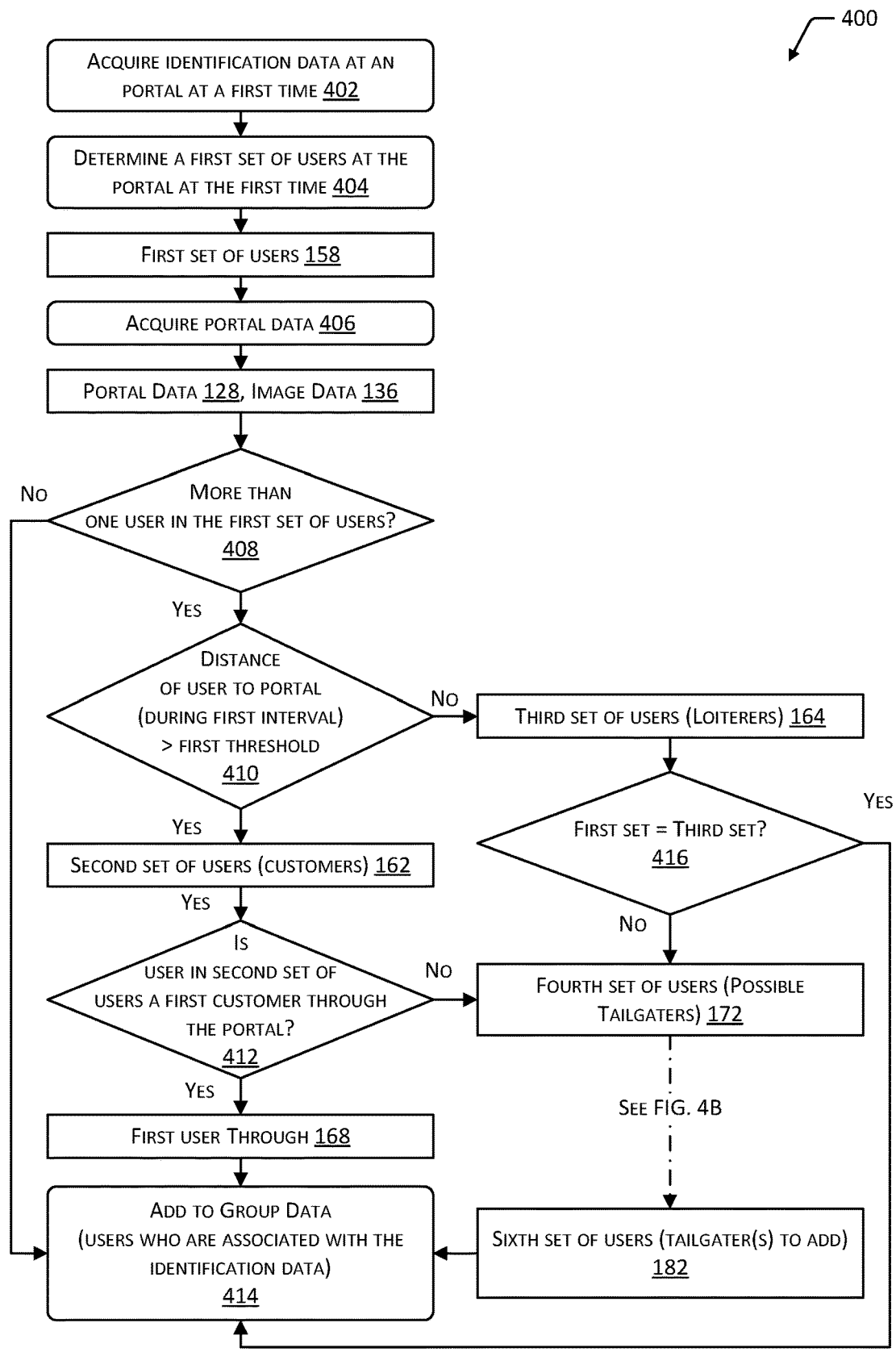
FIGS. 4A and 4B are a flow diagram of a process for determining group data based on data at the portal, according to some implementations.
Figure 4B:
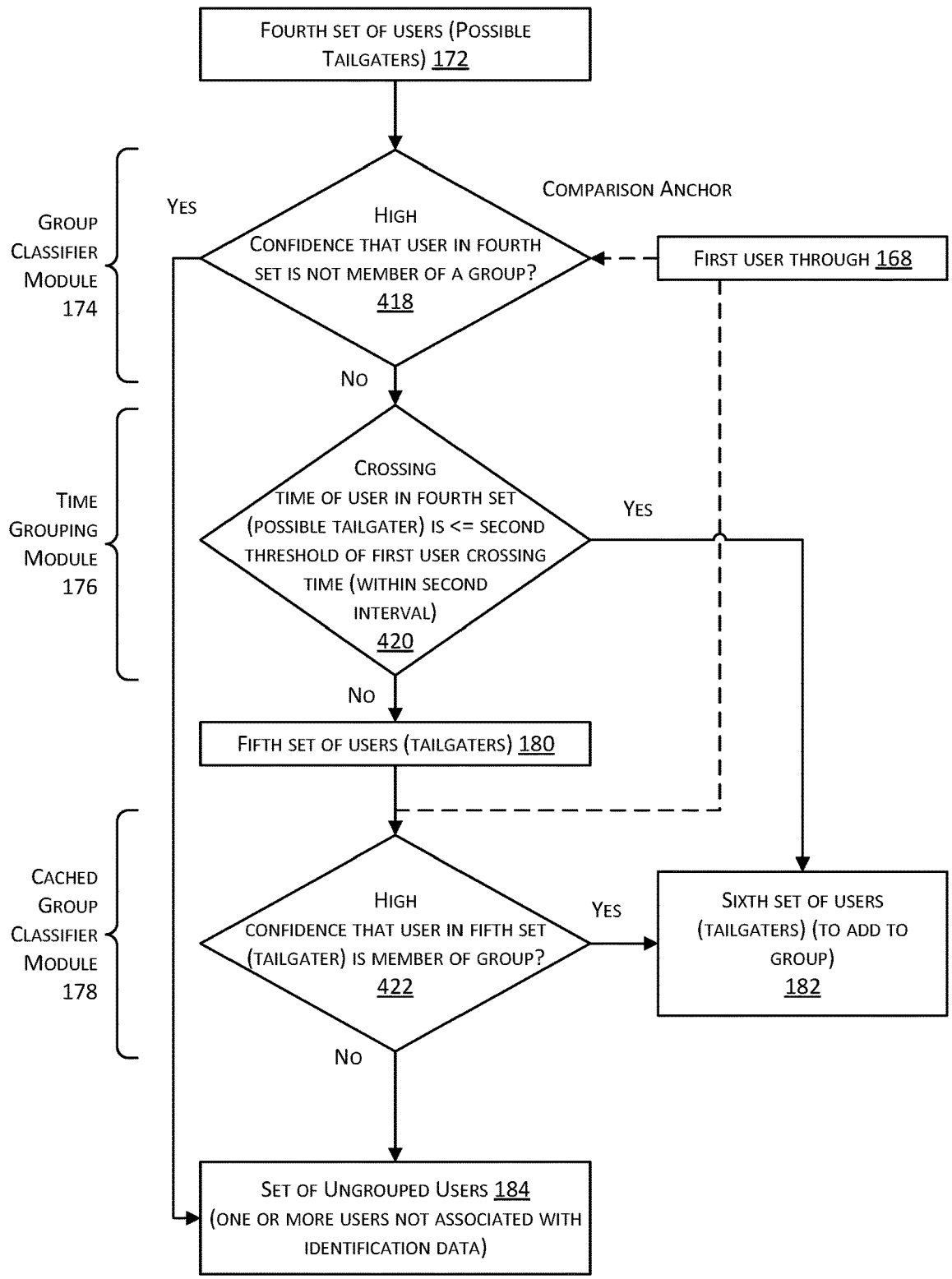

The operation of the group analysis module 156 is discussed in more detail with regard to FIGS. 4A and 4B.

The group analysis module 156 is not limited to determining the group data 188 contemporaneously with the time of entry. The group analysis module 156 may assess data from an earlier time and determine the group data 188. As a result, the group data 188 may be determined minutes, hours, or days, after entrance of one or more users 118 to the facility 102. In some implementations, this late time binding allows for subsequent processes such as a billing module to more accurately associate the charges for interactions with items 116 to a particular user account.

The group data 188 may include data indicative of a confidence value. For example, a high confidence value may indicate a strong likelihood that two or more users 118 are associated with one another.

The group analysis module 156 may operate to determine group data 188 based on portal data 128 associated with entry to the facility 102, exit from the facility 102, or both. In one implementation, the group analysis module 156 may determine the group data 188 as a group of users 118 enters the facility 102. In another implementation, the group analysis module 156 may determine the group data 188 as the group of users 118 leaves the facility 102.

In some implementations, other actions may be invoked responsive to the group data 188. For example, if a user 118 remains ungrouped and has no associated authorized account, an employee may be dispatched to resolve the matter. In another example, the user 118 not associated with an authorized account may be asked to present identification data 134 or some means of payment prior to entry or exit.

In yet another implementation, the group analysis module 156 may determine first group data 188(1) at entry to the facility 102 and second group data 188(2) at exit from the facility 102. In this implementation, if there is a discrepancy between the first group data 188(1) and the second group data 188(2) one or more actions may be invoked. For example, an employee may be dispatched to resolve the discrepancy.

In some implementations, the group data 188 may be subject to confirmation by a human or other system. For example, based on the group data 188 exceeding a threshold confidence level, a message may be sent to the user 118(2) confirming whether they brought a guest to the facility 102 at a particular day and time. Once confirmed, the group data 188 associated with the users 118(2) and 118(3) may be affirmed and subsequently used for billing or other purposes.

Information obtained from one or more users 118 may also be used to generate the group data 188. For example, the user 118 may use an application on their smartphone to input the number of guests they will be bringing to the facility 102, or that they have brought to the facility 102. Based at least in part on this information, the group analysis module 156 may generate the group data 188.

A facility management module 190 may provide various functions associated with operation of the facility 102. The facility management module 190 may maintain information about inventory levels of items 116, determine when to restock of items 116, direct robots to restock, bill user accounts for interactions by users 118 such as picks of items 116, and so forth. For example, the facility management module 190 may use sensor data such as the image data 136 to determine that the user 118(3) has picked item 116(1) from inventory location 114(7). Based on the group data 188, the facility management module 190 may bill the account of the user 118(2) for the item 116(1) picked by the user 118(3).

Figure 2:
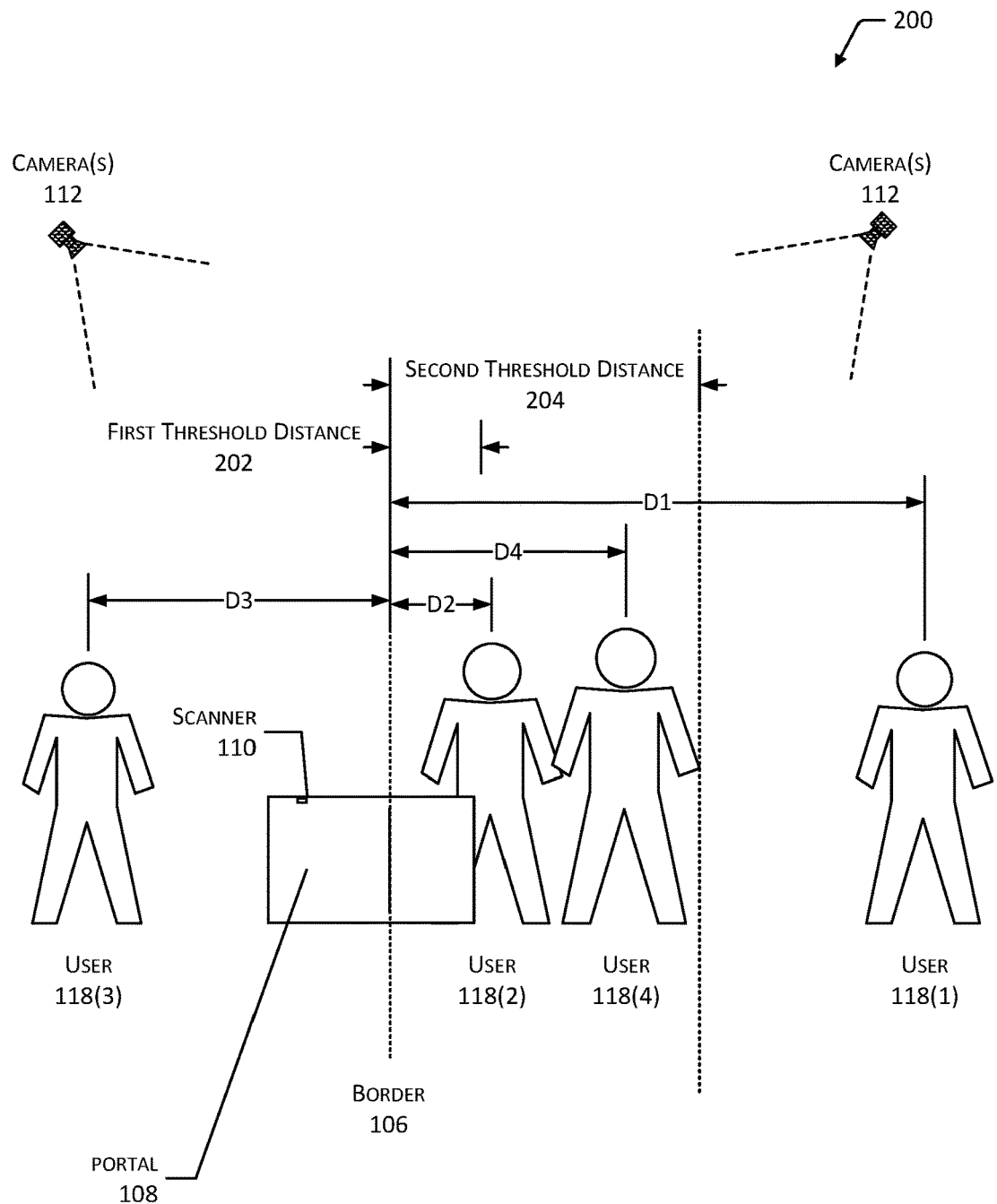
FIG. 2 illustrates various users at a portal of the facility, according to some implementations.

FIG. 2 illustrates at 200 users 118 at a portal 108 of the facility 102, according to some implementations. Cameras 112 acquire image data 136 of the portal area 104. Four users 118(1)-(4) are shown at respective distances D1, D2, D3, and D4 relative to the border 106. These distances may be a distance at a particular time, an average distance over some time interval, a maximum distance within the time interval, and so forth. A first threshold distance 202 relative to the border 106 is shown. A second threshold distance 204 relative to the border 106 is also shown, with the second threshold distance 204 being greater than the first threshold distance 202. These threshold distances may be used by the distance analysis module 160, and are discussed with regard to FIGS. 4A and 4B.

Figure 3:
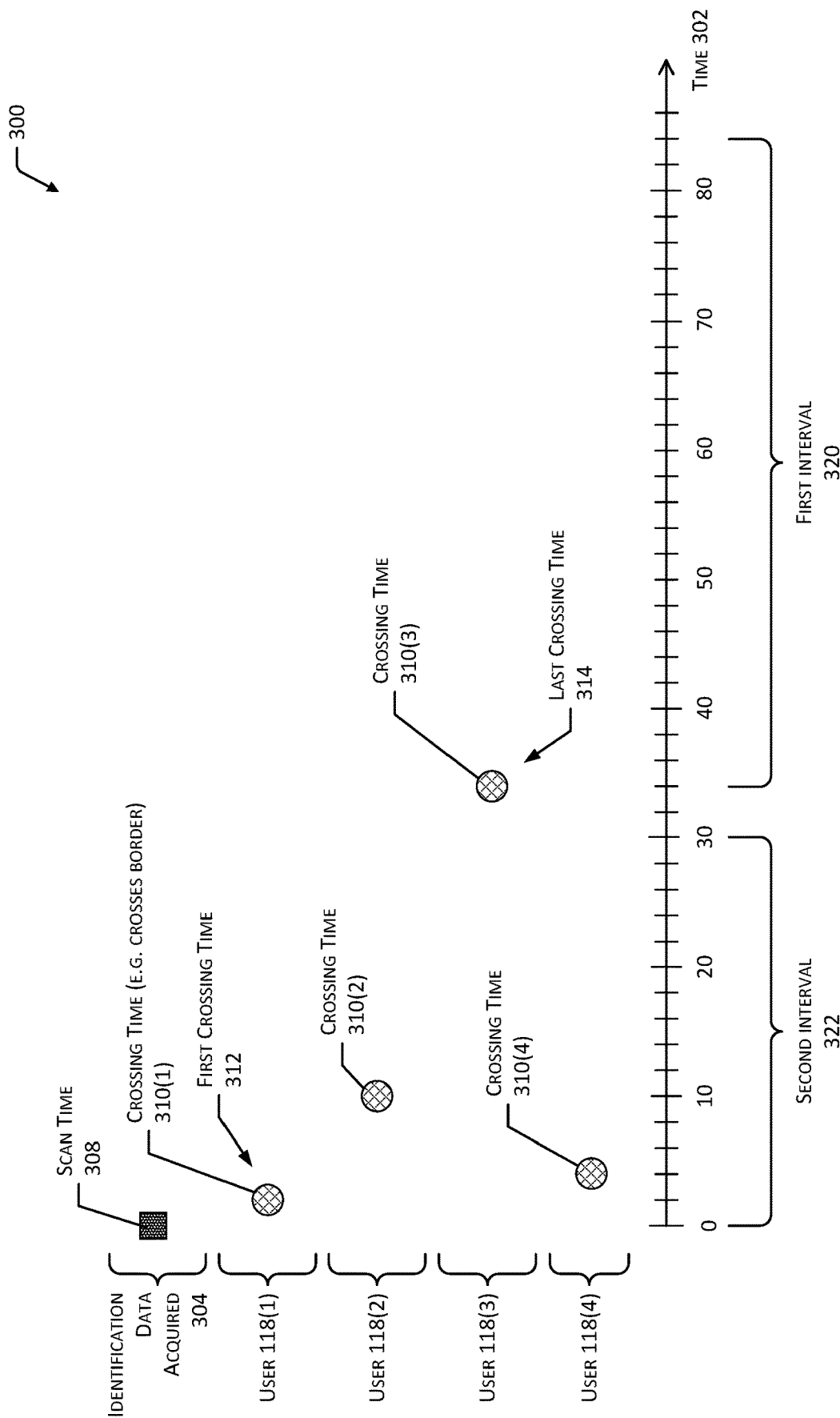
FIG. 3 illustrates timing of events associated with the portal, according to some implementations.

FIG. 3 illustrates at 300 timing of events associated with the portal 108, according to some implementations. In this illustration time 302 is indicated along a horizontal axis. Identification data acquired 304 and users 118(1)-(4) with respect to a vertical axis. At time 0, identification data 134 is acquired 304 at a scan time 308. For example, a user 118 may present their hand for input of biometric data. At time 1 user 118(1) passes the border 106 into the facility 102 as indicated by crossing time 310(1). At time 2 user 118(4) passes the border 106 into the facility 102 as indicated by crossing time 310(4). At time 5 user 118(2) passes the border 106 into the facility 102 as indicated by crossing time 310(2). At time 17 user 118(3) passes the border 106 into the facility 102 as indicated by crossing time 310(3). The first crossing time 310(1) occurs before other crossing times 310, and so is designated as a first crossing time 312. A last crossing time 314 is the latest crossing time 310. For example, the crossing sequence module 166 may determine the first crossing time 312 and the last crossing time 314.

A first interval 320 and a second interval 322 are shown. In one implementation the first interval 320 may begin at the last crossing time 314. In one implementation, the first interval 320 may be 50 seconds in duration. In one implementation the second interval 322 may begin at the scan time 308. In some implementations the second interval 322 may be 30 seconds in duration.

FIGS. 4A and 4B are a flow diagram 400 of a process for determining group data 188 based on data at the portal 108, according to some implementations. The group data 188 may be determined for situations involving one or more of users 118 entering or exiting the facility 102.

At 402 identification data 134 is acquired at a portal 108 at a first time. For example, a user 118 may present their hand to a scanner 110 to acquire biometric input data before entry to the facility 102 or at exit from the facility 102.

At 404 a first set of users 158 is determined at the portal 108 at the first time. For example, the first set of users 158 may comprise those users 118 that are within the portal area 104 at the first time, as indicated by the user location data 146. In another example, the first set of users 158 may comprise those users 118 that are within the entryway of the portal area 104 at the first time, as indicated by the user location data 146.

At 406 one or more of portal data 128 or image data 136 is acquired. For example, the portal data 128 may comprise barrier state 130, portal sensor data 132, and so forth. In some implementations the portal data 128 may include image data 136 acquired by the cameras 112 having respective fields of view that include at least a portion of the portal area 104. The one or more of portal data 138 or image data 136 may be processed to determine information such as a user identifier 144, user location data 146, and so forth.

At 408 a determination is made as to whether there is more than one user 118 in the first set of users 158. For example, the group analysis module 156 may determine a count of user identifiers 144 that have user location data 146 that is within a specified area of the portal area 104 during a specified time interval. If not, the process proceeds to 414. If yes, the process proceeds to 410.

At 410 a determination is made as to whether one or more distances of the user 118 relative to a reference location during the first interval 320 is greater than a first threshold or first set of thresholds. These distances may comprise Euclidean distances between the user location indicated by the user location data 146 and the reference location. The reference location may be specified with respect to one or more of the portal 108, a crossing location comprising a point at which the user location intersected the border 106, and so forth. In one implementation, the first interval 320 may begin at the last crossing time 314. In other implementations, the first interval 320 may begin responsive to another event.

In one implementation, the distance analysis module 160 may use at least a portion of the user path 122 associated with a particular user identifier 144. For example, the user path 122 may comprise user location data 146 during a time interval beginning after passing the border 106 to enter the facility 102. This user location data 146 may be used to determine an average crossing distance that is calculated as an average of distances between the user location and the crossing location associated with the portal 108. A maximum crossing distance may also be determined that is indicative of a maximum distance between the user location and the crossing location during the first time interval. In one implementation the time interval may be 30 seconds.

At 410, the distance analysis module 160 may perform a dual comparison: the average crossing distance of the user 118 may be compared to determine if this is less than the first threshold distance 202, and the maximum crossing distance of the user 118 may be compared to determine if this is less than the second threshold distance 204. If either of these comparisons is true, the process adds the user 118 to the second set of users 162 and proceeds to 412. In an implementation where the facility 102 is a store, the second set of users 162 may be considered customers. If both of these comparisons are false, the process adds the user 118 to the third set of users 164 and proceeds to 416. In the implementation where the facility is a store, the third set of users 162 may be considered loiterers. These loiterers may be employees or customers who are waiting near the portal 108. The assessment of the third set of users 164 is discussed in more detail below.

The determination at 410 as to whether a user is a loiterer assists in resolving scenarios in which an employee front-gates or tailgates a user 118 who has provided identification data 134 and then promptly returns to the entryway. For example, the employee waiting in the entryway may assist a user 118(1) by helping the user 118(1) provide their identification data 134. Continuing the example, the user 118(1) and any other users 118(N) that are attending the facility 102 with the user 118(1) pass through the portal 108 and into the facility 102. After that, the employee passes through a portal 108 and returns to the entryway.

At 412 a determination is made as to whether the user 118 in the second set of users 162 is the first user through 168 the portal 108. The crossing sequence module 166 may determine which user identifier 144 has an earliest crossing time, and designate this user 118 as the first user through 168. If the user 118 in the second set of users 162 is the same as the user 118 indicated by the first user through 168, the process proceeds to 414. If no, the user 118 who is not the first through the portal 108, is added to the fourth set of users 172. This fourth set of users 172 may be considered possible tailgaters.

At 414 the user 118 is added to the group data 188. For example, if at 408 only one user 118 is in the first set of users 158, the group data 188 indicates that this user 118 is a group of one, or solo.

Returning to 410, if the determination is no, the third set of users 164 are assessed at 416. At 416, a determination is made as to whether the first set of users 158 is equal to the third set of users 164. For example, if the set of user identifiers 144 in the third set of users 164 is identical to the set of user identifiers 144 in the first set of users 158, the two may be deemed to be equal. This determination assists in resolving the scenario in which a group of users 118 are near the portal 108. For example, a group of users 118 may enter to shop, picking items that are stored at the inventory location 114 that is close to the portal 108. Having picked their items, they then exit the facility 102.

If the determination at 416 is yes, the process proceeds to 414 and the third set of users 164 are added to the group data 188 and are thus associated with the identification data 134 presented at the first time. If the determination at 416 is no, the third set of users 164 are added to the fourth set of users 172.

The processing of the fourth set of users 172 is discussed with regard to FIG. 4B.

At 418 the group classifier module 174 determines a confidence value that is indicative of a likelihood that the user 118 in the fourth set of users 172 is not a member of the group indicated by the group data 188. For example, the user 118 being assessed is compared to the first user through 168 that acts as a comparison anchor for the classifier. A high confidence threshold may be specified. If the confidence value is greater than the high confidence threshold, the process proceeds to add the user 118 to the set of ungrouped users 184. If not, the process proceeds to 420.

At 420 the time grouping module 176 determines if a crossing time 310 of the user 118 from the fourth set of users 172 is within the second interval 322. For example, the crossing time 310 may be determined to be less than or equal to a second time threshold with respect to the scan time 308. If yes, the user 118 from the fourth set of users 172 is added to the sixth set of users 182. As mentioned above, the sixth set of users 182 are then added to the group data 188. If no, the user 118 is added to the fifth set of users 180 and the process proceeds to 422.

At 422 the cached group classifier module 178 determines if there is a high confidence that the user 118 in the fifth set of users 180 is a member of the group as indicated by the group data 188. If yes, the user 118 is added to the sixth set of users 182. If no, the user 118 is added to the set of ungrouped users 184. In some implementations, the cached group classifier module 178 may utilize a previously determined prediction score determined by the group classifier module 174. For example, if a confidence value for the user 118 is greater than a threshold value, such as 0.26, that user 118 may be added to the sixth set of users 182. Continuing the example, if the confidence value for the user 118 is less than the threshold value, the user 118 may be added to the set of ungrouped users 184.

Figure 5:
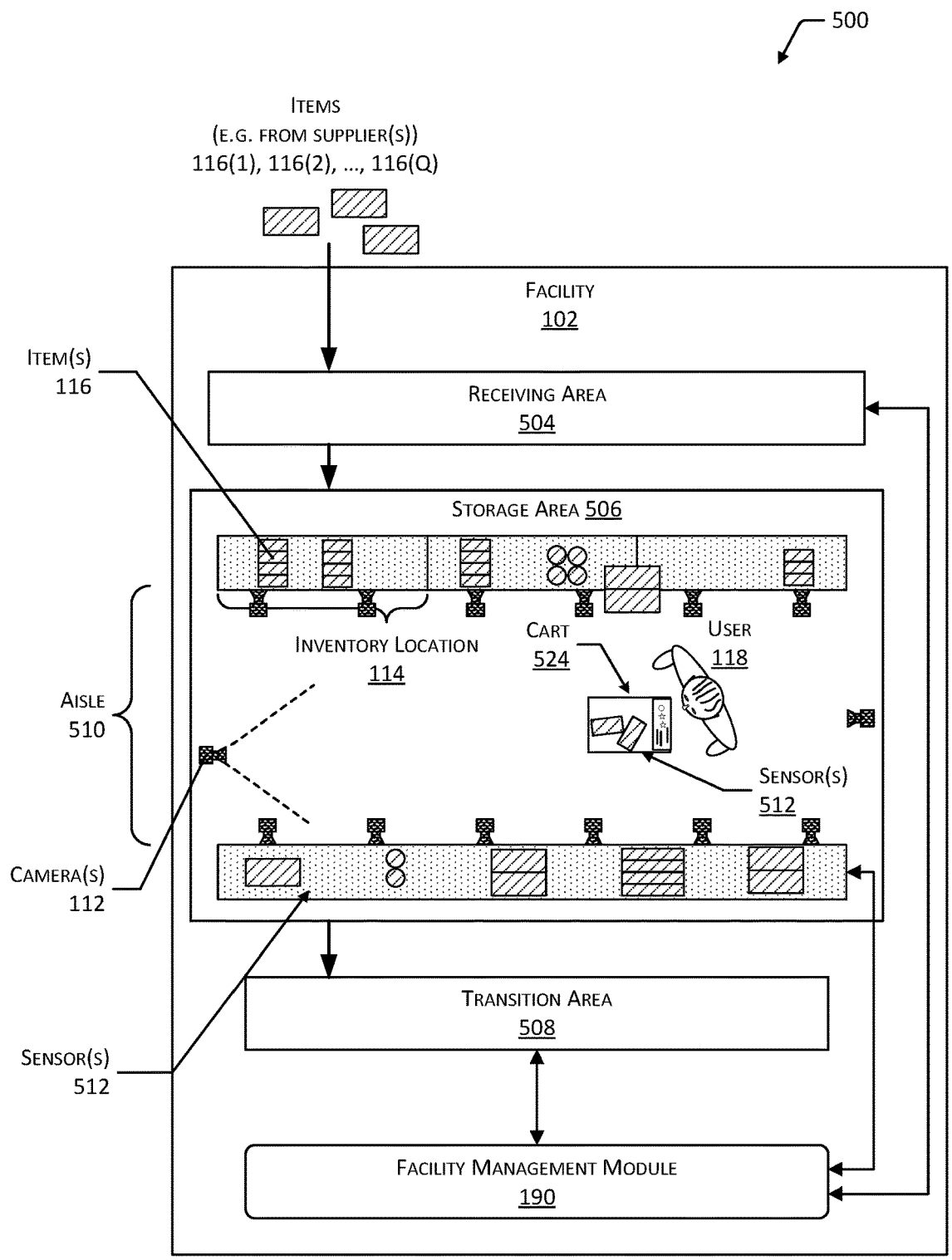
FIG. 5 is a block diagram illustrating a facility using the system, according to some implementations.

FIG. 5 is a block diagram 500 illustrating a materials handling facility (facility) 102 using the system 100, according to some implementations. A facility 102 comprises one or more physical structures or areas within which one or more items 116(1), 116(2), . . . , 116(Q) may be held. The items 116 may comprise physical goods, such as books, pharmaceuticals, repair parts, electronic gear, and so forth.

The facility 102 may include one or more areas designated for different functions with regard to inventory handling. In this illustration, the facility 102 includes a receiving area 504, a storage area 506, and a transition area 508.

The receiving area 504 may be configured to accept items 116, such as from suppliers, for intake into the facility 102. For example, the receiving area 504 may include a loading dock at which trucks or other freight conveyances unload the items 116. In some implementations, the items 116 may be processed, at the receiving area 504, to generate at least a portion of item data. For example, an item 116 may be weighed, imaged, or otherwise scanned to develop reference images or representations of the item 116 at the receiving area 504.

The storage area 506 is configured to store the items 116. The storage area 506 may be arranged in various physical configurations. In one implementation, the storage area 506 may include one or more aisles 510. The aisle 510 may be configured with, or defined by, inventory locations 114 on one or both sides of the aisle 510. The inventory locations 114 may include one or more of a platform, a rack, a case, a cabinet, a bin, a floor location, or other suitable storage mechanisms for holding, supporting, or storing the items 116. For example, the inventory locations 114 may comprise shelves with areas such as lanes designated therein. The inventory locations 114 may be affixed to the floor or another portion of the structure of the facility 102. The inventory locations 114 may also be movable such that the arrangements of aisles 510 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more user 118(1), 118(2), . . . , 118(U) and carts 524(1), 524(2), . . . , 524(T) or other material handling apparatus may move within the facility 102. For example, the user 118 may move about within the facility 102 to pick or place the items 116 in various inventory locations 114, placing them in the cart 524 for ease of transport. The cart 524 is configured to carry or otherwise transport one or more items 116. For example, the cart 524 may include a basket, bag, bin, and so forth. In other implementations, other material handling apparatuses such as robots, forklifts, cranes, aerial drones, and so forth, may move about the facility 102 picking, placing, or otherwise moving the items 116. For example, a robot may pick an item 116 from a first inventory location 114(1) and move the item 116 to a second inventory location 114(2).

While the storage area 506 is depicted as having one or more aisles 510, inventory locations 114 storing the items 116, sensors 512, and so forth, it is understood that the receiving area 504, the transition area 508, or other areas of the facility 102 may be similarly equipped. Furthermore, the arrangement of the various areas within the facility 102 is depicted functionally rather than schematically. For example, in some implementations, multiple different receiving areas 504, storage areas 506, and transition areas 508 may be interspersed rather than segregated in the facility 102.

The facility 102 may include, or be coupled to, one or more servers 124 providing the facility management module 190 described above. The facility management module 190 is configured to interact with users 118 or devices such as sensors 512, robots, material handling equipment, computing devices, and so forth, in one or more of the receiving area 504, the storage area 506, or the transition area 508.

During operation of the facility 102, the weight sensors 512(1) and other sensors 512 may be configured to provide sensor data, or information based on the sensor data, to the facility management module 190. In addition to data obtained from the weight sensors 512(1), the sensor data may include image data 136, non-image data, and so forth. The sensors 512 may include, but are not limited to, cameras 112, weight sensors 512(1), and so forth. The sensors 512 may be stationary or mobile, relative to the facility 102. For example, the facility 102 may include cameras 112 to obtain images of the user 118 or other objects in the facility 102. In another example, the inventory locations 114 may contain weight sensors 512(1) to acquire weight sensor data of items 116 stowed therein, cameras 112 to acquire images of picking or placement of items 116 on shelves, and so forth. The sensors 512 are described in more detail below with regard to FIG. 6.

The facility management module 190 or other systems may use the sensor data to track the location of objects within the facility 102, movement of the objects, or provide other functionality. Objects may include, but are not limited to, items 116, users 118, carts 524, and so forth. For example, a series of images acquired by the cameras 112 may indicate removal by the user 118 of an item 116 from a particular location at the inventory location 114 and placement of the item 116 on or at least partially within the cart 524.

The facility 102 may be configured to receive different kinds of items 116 from various suppliers and to store them until a customer orders or retrieves one or more of the items 116. A general flow of items 116 through the facility 102 is indicated by the arrows of FIG. 5. Specifically, as illustrated in this example, items 116 may be received from one or more suppliers, such as manufacturers, distributors, wholesalers, and so forth, at the receiving area 504. In various implementations, the items 116 may include merchandise, commodities, perishables, or any suitable type of item 116, depending on the nature of the enterprise that operates the facility 102.

Upon being received from a supplier at the receiving area 504, the items 116 may be prepared for storage in the storage area 506. For example, in some implementations, items 116 may be unpacked or otherwise rearranged. The facility management module 190 may include one or more software applications executing on a computer system to provide inventory management functions. These inventory management functions may include maintaining information indicative of the type, quantity, condition, cost, location, weight, or any other suitable parameters with respect to the items 116. The items 116 may be stocked, managed, or dispensed in terms of countable units, individual units, or multiple units, such as packages, cartons, crates, pallets, or other suitable aggregations. Alternatively, some items 116, such as bulk products, commodities, and so forth, may be stored in continuous or arbitrarily divisible amounts that may not be inherently organized into countable units. Such items 116 may be managed in terms of a measurable quantity such as units of length, area, volume, weight, time, duration, or other dimensional properties characterized by units of measurement. Generally speaking, a quantity of an item 116 may refer to either a countable number of individual or aggregate units of an item 116 or a measurable amount of an item 116, as appropriate.

After arriving through the receiving area 504, items 116 may be stored within the storage area 506. In some implementations, like items 116 may be stored or displayed together in the inventory locations 114 such as in bins, on shelves, hanging from pegboards, and so forth. In this implementation, all items 116 of a given kind are stored in one inventory location 114. In other implementations, like items 116 may be stored in different inventory locations 114. For example, to optimize retrieval of certain items 116 having frequent turnover within a large physical facility 102, those items 116 may be stored in several different inventory locations 114 to reduce congestion that might occur at a single inventory location 114.

When a customer order specifying one or more items 116 is received, or as a user 118 progresses through the facility 102, the corresponding items 116 may be selected or "picked" from the inventory locations 114 containing those items 116. In various implementations, item picking may range from manual to completely automated picking. For example, in one implementation, a user 118 may have a list of items 116 they desire and may progress through the facility 102 picking items 116 from inventory locations 114 within the storage area 506 and placing those items 116 into a cart 524. In other implementations, employees of the facility 102 may pick items 116 using written or electronic pick lists derived from customer orders. These picked items 116 may be placed into the cart 524 as the employee progresses through the facility 102.

After items 116 have been picked, the items 116 may be processed at a transition area 508. The transition area 508 may be any designated area within the facility 102 where items 116 are transitioned from one location to another or from one entity to another. For example, the transition area 508 may be a packing station within the facility 102. When the item 116 arrives at the transition area 508, the item 116 may be transitioned from the storage area 506 to the packing station. Information about the transition may be maintained by the facility management module 190.

In another example, if the items 116 are departing the facility 102, a list of the items 116 may be obtained and used by the facility management module 190 to transition responsibility for, or custody of, the items 116 from the facility 102 to another entity. For example, a carrier may accept the items 116 for transport with that carrier accepting responsibility for the items 116 indicated in the list. In another example, a user 118 may purchase or rent the items 116 and remove the items 116 from the facility 102. During use of the facility 102, the user 118 may move about the facility 102 to perform various tasks, such as picking or placing the items 116 in the inventory locations 114.

To facilitate operation of the facility 102, the facility management module 190 is configured to use the identification data 134, sensor data, and other information such as item data, physical layout data, and so forth, to generate interaction data.

The interaction data may provide information about an interaction, such as a pick of an item 116 from the inventory location 114, a place of an item 116 to the inventory location 114, a touch made to an item 116 at the inventory location 114, a gesture associated with an item 116 at the inventory location 114, and so forth. The interaction data may include one or more of the type of interaction, interaction location identifier indicative of where from the inventory location 114 the interaction took place, item identifier, quantity change to the item 116, user identifier 144, and so forth. The interaction data may then be used to further update the item data. For example, the quantity of items 116 on hand at a particular lane on the platform may be changed based on an interaction that picks or places one or more items 116.

As described above, the facility management module 190 may perform other operations, determining inventory to restock, determining user billing data, and so forth.

Figure 6:
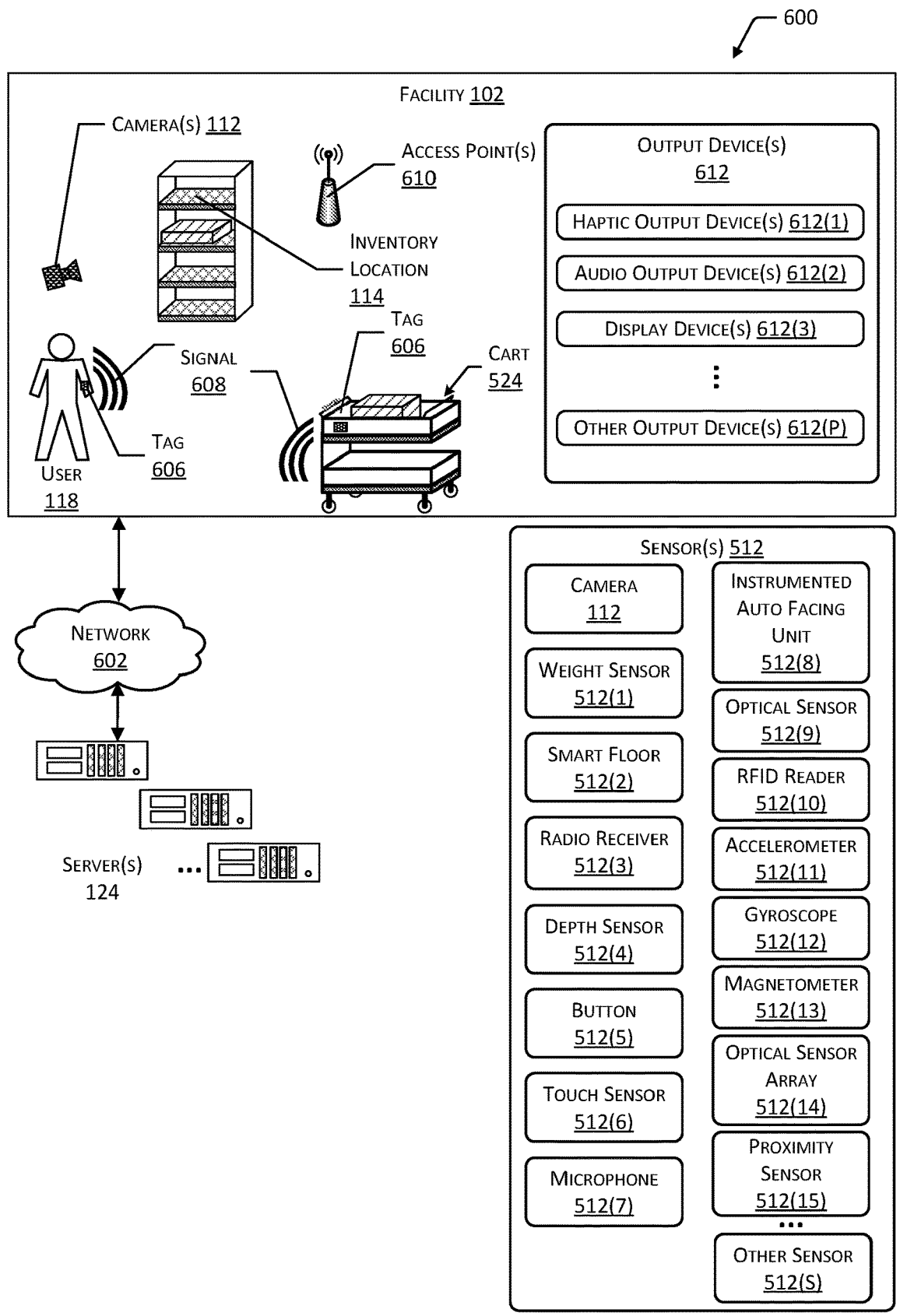
FIG. 6 is a block diagram illustrating additional details of the facility, according to some implementations.

FIG. 6 is a block diagram 600 illustrating additional details of the facility 102, according to some implementations. The facility 102 may be connected to one or more networks 602, which in turn connect to one or more computing devices, such as servers 124. The network 602 may include private networks such as an institutional or personal intranet, public networks such as the Internet, or a combination thereof. The network 602 may utilize wired technologies (e.g., wires, fiber optic cables, and so forth), wireless technologies (e.g., radio frequency, infrared, acoustic, optical, and so forth), or other connection technologies. The network 602 is representative of any type of communication network, including one or more of data networks or voice networks. The network 602 may be implemented using wired infrastructure (e.g., copper cable, fiber optic cable, and so forth), a wireless infrastructure (e.g., cellular, microwave, satellite, and so forth), or other connection technologies.

The servers 124 may be configured to execute one or more modules or software applications associated with the facility management module 190 or other systems. While the servers 124 are illustrated as being in a location outside of the facility 102, in other implementations, at least a portion of the servers 124 may be located at the facility 102. The servers 124 are discussed in more detail below with regard to FIG. 7.

The user 118, the carts 524, items 116, or other objects in the facility 102 may be equipped with one or more tags 606. The tags 606 may be configured to emit a signal 608. In one implementation, the tag 606 may be a radio frequency identification (RFID) tag 606 configured to emit a RF signal 608 upon activation by an external signal. For example, the external signal may comprise a radio frequency signal or a magnetic field configured to energize or activate the RFID tag 606. In another implementation, the tag 606 may comprise a transmitter and a power source configured to power the transmitter. For example, the tag 606 may comprise a Bluetooth Low Energy (BLE) transmitter and battery. In other implementations, the tag 606 may use other techniques to indicate presence of the tag 606. For example, an acoustic tag 606 may be configured to generate an ultrasonic signal 608, which is detected by corresponding acoustic receivers. In yet another implementation, the tag 606 may be configured to emit an optical signal 608.

The facility management module 190 may be configured to use the tags 606 for one or more of identification of the object, determining a location of the object, and so forth. For example, the user 118 may wear tags 606, the carts 524 may have tags 606 affixed, items 116 may have tags 606 affixed to their packaging, and so forth, which may be read and, based at least in part on signal strength, used to determine one or more of identity or location.

Generally, the facility management module 190 or other systems associated with the facility 102 may include any number and combination of input components, output components, and servers 124.

The one or more sensors 512 may be arranged at one or more locations within the facility 102. For example, the sensors 512 may be mounted on or within a floor, wall, at a ceiling, at an inventory location 114, on a cart 524, may be carried or worn by a user 118, and so forth.

The sensors 512 may include one or more cameras 112 or other imaging sensors. The one or more cameras 112 may include imaging sensors configured to acquire images of a scene. The cameras 112 are configured to detect light in one or more wavelengths including, but not limited to, terahertz, infrared, visible, ultraviolet, and so forth. The cameras 112 may comprise charge coupled devices (CCD), complementary metal oxide semiconductor (CMOS) devices, microbolometers, and so forth. The facility management module 190 may use image data 136 acquired by the cameras 112 during operation of the facility 102. For example, the facility management module 190 may identify items 116, user 118, carts 524, and so forth, based at least in part on their appearance within the image data 136 acquired by the cameras 112. The cameras 112 may be mounted in various locations within the facility 102. For example, cameras 112 may be mounted overhead, on inventory locations 114, may be worn or carried by the user 118, may be affixed to carts 524, and so forth.

The one or more weight sensors 512(1) are configured to measure the weight of a load, such as the item 116, the cart 524, or other objects. The weight sensors 512(1) may be configured to measure the weight of the load at one or more of the inventory locations 114, the cart 524, on the floor of the facility 102, and so forth. For example, a platform of the inventory location 114 may include a plurality of weight sensors 512(1). The weight sensors 512(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 512(1) may operate as transducers that generate one or more signals 608 based on an applied force, such as that of the load due to gravity. For example, the weight sensor 512(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 512(1) may comprise a force sensing resistor (FSR). The FSR may comprise a resilient material that changes one or more electrical characteristics when compressed. For example, the electrical resistance of a particular portion of the FSR may decrease as the particular portion is compressed. The facility management module 190 may use the data acquired by the weight sensors 512(1) to identify an object, determine a change in the quantity of objects, determine a location of an object, maintain shipping records, and so forth.

The sensors 512 may include a smart floor 512(2). The smart floor 512(2) is able to provide information about the location of objects, such as user 118, carts 524, and so forth. This information may include identifying the object, determining a location of the object, tracking the object, and so forth. The smart floor 512(2) may utilize smart floor devices that comprise one or more of transmitters or receivers that radiate or receive electromagnetic signals 608 from antennas located at or underneath the floor. Based on information about what antenna radiated a signal 608 and what antenna acquired the signal 608, information about an object on or above the floor may be determined. For example, the smart floor 512(2) may comprise sensing elements, or segments. Each segment may include an antenna that is coupled to one or more of a transmitter or a receiver. During operation, the segment may transmit an electromagnetic signal 608 that is radiated by the antenna, receive an electromagnetic signal 608 that is acquired by the antenna, or both. In some implementations the smart floor 512(2) may operate as a physically large touch sensor that is deployed at floor level. The electromagnetic signals 608 to provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 512(2) may be used to provide object representation movement data. For example, the output from the segments obtained during a particular window of time may be processed in a fashion similar to the image data 136.

One or more radio receivers 512(3) may also be included as sensors 512. In some implementations, the radio receivers 512(3) may be part of transceiver assemblies. The radio receivers 512(3) may be configured to acquire RF signals 608 associated with RFID, Wi-Fi, Bluetooth, ZigBee, 2G, 3G, 4G, LTE, or other wireless data transmission technologies. The radio receivers 512(3) may provide information associated with data transmitted via radio frequencies, signal strength of RF signals 608, and so forth. For example, information from the radio receivers 512(3) may be used by the facility management module 190 to determine a location of an RF source, such as a transmitter carried by the user 118, a transmitter on the cart 524, a tag 606 on the item 116, and so forth.

One or more depth sensors 512(4) may also be included in the sensors 512. The depth sensors 512(4) are configured to acquire spatial or three-dimensional (3D) data, such as depth information, about objects within a field of view (FOV). The depth sensors 512(4) may include range cameras, lidar systems, sonar systems, radar systems, structured light systems, stereo vision systems, optical interferometry systems, and so forth. The facility management module 190 may use the 3D data acquired by the depth sensors 512(4) to identify objects, determine a location of an object in 3D real space, identify the user 118, and so forth.

One or more buttons 512(5) may be configured to accept input from the user 118. The buttons 512(5) may comprise mechanical, capacitive, optical, or other mechanisms. For example, the buttons 512(5) may comprise mechanical switches configured to accept an applied force from a touch of the user 118 to generate an input signal. The facility management module 160 may use data from the buttons 512(5) to receive information from the user 118. For example, the cart 524 may be configured with a button 512(5) to accept input from the user 118 and send information indicative of the input to the facility management module 190.

The sensors 512 may include one or more touch sensors 512(6). The touch sensors 512(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The facility management module 190 may use data from the touch sensors 512(6) to receive information from the user 118. For example, the touch sensor 512(6) may be integrated with the cart 524 to provide a touchscreen with which the user 118 may select from a menu one or more particular items 116 for picking, enter a manual count of items 116 at an inventory location 114, and so forth.

One or more microphones 512(7) may be configured to acquire information indicative of sound present in the environment. In some implementations, arrays of microphones 512(7) may be used. These arrays may implement beamforming techniques to provide for directionality of gain. The facility management module 190 may use the one or more microphones 512(7) to acquire information from acoustic tags, accept voice input from the user 118, determine ambient noise level, and so forth.

The sensors 512 may include instrumented auto facing units (IAFUs) 512(8). The IAFU 512(8) may comprise a position sensor configured to provide data indicative of displacement of a pusher. As an item 116 is removed from the IAFU 512(8), the pusher moves, such as under the influence of a spring, and pushes the remaining items 116 in the IAFU 512(8) to the front of the inventory location 114. By using data from the position sensor, and given item data such as a depth of an individual item 116, a count may be determined, based on a change in position data. For example, if each item 116 is 1 inch deep, and the position data indicates a change of 6 inches, the quantity held by the IAFU 512(8) may have changed by 6 items 116. This count information may be used to confirm or provide a cross check for a count obtained by other means, such as analysis of the sensor data from the weight sensors 512(1).

The sensors 512 may include one or more optical sensors 512(9). The optical sensors 512(9) may be configured to provide data indicative of one or more of color or intensity of light impinging thereupon. For example, the optical sensor 512(9) may comprise a photodiode and associated circuitry configured to generate a signal 608 or data indicative of an incident flux of photons. As described below, the optical sensor array 512(14) may comprise a plurality of the optical sensors 512(9). The optical sensors 512(9) may include photodiodes, photoresistors, photovoltaic cells, quantum dot photoconductors, bolometers, pyroelectric infrared detectors, and so forth. For example, the optical sensor 512(9) may use germanium photodiodes to detect infrared light.

One or more radio frequency identification (RFID) readers 512(10), near field communication (NFC) systems, and so forth, may be included as sensors 512. For example, the RFID readers 512(10) may be configured to read the RF tags 606. Information acquired by the RFID reader 512(10) may be used by the facility management module 190 to identify an object associated with the RF tag 606 such as the item 116, the user 118, the cart 524, and so forth. For example, based on information from the RFID readers 512(10) detecting the RF tag 606 at a particular inventory location 114, an item 116 being placed or picked may be determined.

The sensors 512 may include one or more accelerometers 512(11), which may be worn or carried by the user 118, mounted to the cart 524, and so forth. The accelerometers 512(11) may provide information such as the direction and magnitude of an imposed acceleration. Data such as rate of acceleration, determination of changes in direction, speed, and so forth, may be determined using the accelerometers 512(11).

A gyroscope 512(12) may provide information indicative of rotation of an object affixed thereto. For example, the cart 524 or other objects may be equipped with a gyroscope 512(12) to provide data indicative of a change in orientation of the object.

A magnetometer 512(13) may be used to determine an orientation by measuring ambient magnetic fields, such as the terrestrial magnetic field. The magnetometer 512(13) may be worn or carried by the user 118, mounted to the cart 524, and so forth. For example, the magnetometer 512(13) mounted to the cart 524 may act as a compass and provide information indicative of which direction the cart 524 is oriented.

An optical sensor array 512(14) may comprise one or more optical sensors 512(9). The optical sensors 512(9) may be arranged in a regular, repeating, or periodic two-dimensional arrangement such as a grid. The optical sensor array 512(14) may generate image data 136. For example, the optical sensor array 512(14) may be arranged within or below an inventory location 114 and obtain information about shadows of items 116, hand of the user 118, and so forth.

The sensors 512 may include proximity sensors 512(15) used to determine presence of an object, such as the user 118, the cart 524, and so forth. The proximity sensors 512(15) may use optical, electrical, ultrasonic, electromagnetic, or other techniques to determine a presence of an object. In some implementations, the proximity sensors 512(15) may use an optical emitter and an optical detector to determine proximity. For example, an optical emitter may emit light, a portion of which may then be reflected by the object back to the optical detector to provide an indication that the object is proximate to the proximity sensor 512(15). In other implementations, the proximity sensors 512(15) may comprise a capacitive proximity sensor 512(15) configured to provide an electrical field and determine a change in electrical capacitance due to presence or absence of an object within the electrical field.

The proximity sensors 512(15) may be configured to provide sensor data indicative of one or more of a presence or absence of an object, a distance to the object, or characteristics of the object. An optical proximity sensor 512(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 512 such as a camera 112. Based on an apparent distance between the features of the structured light pattern, the distance to the object may be calculated. Other techniques may also be used to determine distance to the object. In another example, the color of the reflected light may be used to characterize the object, such as skin, clothing, cart 524, and so forth.

The sensors 512 may include other sensors 512(S) as well. For example, the other sensors 512(S) may include light curtains, ultrasonic rangefinders, thermometers, barometric sensors, hygrometers, and so forth.

In some implementations, the sensors 512 may include hardware processors, memory, and other elements configured to perform various functions. For example, the cameras 112 may be configured to generate image data 136, send the image data to another device such as the server 124, and so forth.

The facility 102 may include one or more access points 610 configured to establish one or more wireless networks. The access points 610 may use Wi-Fi, NFC, Bluetooth, or other technologies to establish wireless communications between a device and the network 602. The wireless networks allow the devices to communicate with one or more of the sensors 512, the facility management module 190, the tags 606, a communication device of the cart 524, or other devices.

Output devices 612 may also be provided in the facility 102. The output devices 612 are configured to generate signals 608, which may be perceived by the user 118 or detected by the sensors 512. In some implementations, the output devices 612 may be used to provide illumination of the optical sensor array 512(14).

Haptic output devices 612(1) are configured to provide a signal 608 that results in a tactile sensation to the user 118. The haptic output devices 612(1) may use one or more mechanisms such as electrical stimulation or mechanical displacement to provide the signal 608. For example, the haptic output devices 612(1) may be configured to generate a modulated electrical signal 608, which produces an apparent tactile sensation in one or more fingers of the user 118. In another example, the haptic output devices 612(1) may comprise piezoelectric or rotary motor devices configured to provide a vibration, which may be felt by the user 118.

One or more audio output devices 612(2) may be configured to provide acoustic output. The acoustic output includes one or more of infrasonic sound, audible sound, or ultrasonic sound. The audio output devices 612(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 612(3) may be configured to provide output, which may be seen by the user 118 or detected by a light-sensitive sensor 512 such as a camera 112 or an optical sensor 512(9). In some implementations, the display devices 612(3) may be configured to produce output in one or more of infrared, visible, or ultraviolet light. The output may be monochrome or in color. The display devices 612(3) may be one or more of emissive, reflective, microelectromechanical, and so forth. An emissive display device 612(3), such as using LEDs, is configured to emit light during operation. In comparison, a reflective display device 612(3), such as using an electrophoretic element, relies on ambient light to present an image. Backlights or front lights may be used to illuminate non-emissive display devices 612(3) to provide visibility of the output in conditions where the ambient light levels are low.

The display devices 612(3) may be located at various points within the facility 102. For example, the addressable displays may be located on inventory locations 114, carts 524, on the floor of the facility 102, and so forth.

Other output devices 612(P) may also be present. For example, the other output devices 612(P) may include scent/odor dispensers, document printers, 3D printers or fabrication equipment, and so forth.

Figure 7:
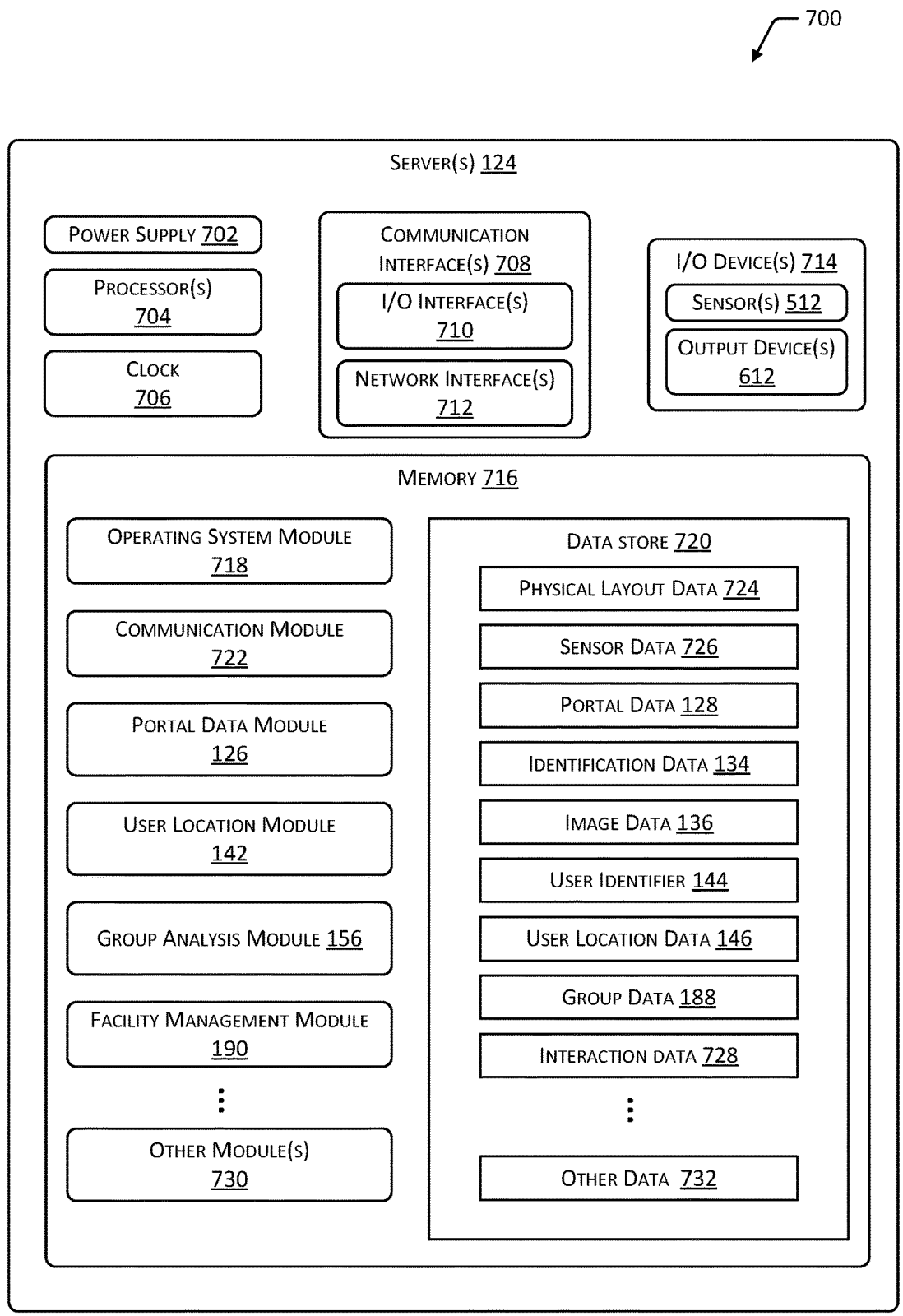
FIG. 7 is a block diagram of a server to support operation of the facility, according to some implementations.

FIG. 7 illustrates a block diagram 700 of a server 124 configured to support operation of the facility 102, according to some implementations. The server 124 may be physically present at the facility 102, may be accessible by the network 602, or a combination of both. The server 124 does not require end-user knowledge of the physical location and configuration of the system that delivers the services. Common expressions associated with the server 124 may include "on-demand computing", "software as a service (SaaS)", "platform computing", "network-accessible platform", "cloud services", "data centers", and so forth. Services provided by the server 124 may be distributed across one or more physical or virtual devices.

One or more power supplies 702 may be configured to provide electrical power suitable for operating the components in the server 124. The one or more power supplies 702 may comprise batteries, capacitors, fuel cells, photovoltaic cells, wireless power receivers, conductive couplings suitable for attachment to an external power source such as provided by an electric utility, and so forth. The server 124 may include one or more hardware processors 704 (processors) configured to execute one or more stored instructions. The processors 704 may comprise one or more cores. One or more clocks 706 may provide information indicative of date, time, ticks, and so forth. For example, the processor 704 may use data from the clock 706 to associate a particular interaction with a particular point in time.

The server 124 may include one or more communication interfaces 708 such as input/output (I/O) interfaces 710, network interfaces 712, and so forth. The communication interfaces 708 enable the server 124, or components thereof, to communicate with other devices or components. The communication interfaces 708 may include one or more I/O interfaces 710. The I/O interfaces 710 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include input devices such as one or more of a sensor 512, keyboard, mouse, scanner, and so forth. The I/O devices 714 may also include output devices 612 such as one or more of a display device 612(3), printer, audio speakers, and so forth. In some embodiments, the I/O devices 714 may be physically incorporated with the server 124 or may be externally placed.

The network interfaces 712 may be configured to provide communications between the server 124 and other devices, such as the carts 524, routers, access points 610, and so forth. The network interfaces 712 may include devices configured to couple to personal area networks (PANS), local area networks (LANs), wireless local area networks (WLANS), wide area networks (WANs), and so forth. For example, the network interfaces 712 may include devices compatible with Ethernet, Wi-Fi, Bluetooth, and so forth.

The server 124 may also include one or more buses or other internal communications hardware or software that allow for the transfer of data between the various modules and components of the server 124.

As shown in FIG. 7, the server 124 includes one or more memories 716. The memory 716 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 716 provides storage of computer-readable instructions, data structures, program modules, and other data for the operation of the server 124. A few example functional modules are shown stored in the memory 716, although the same functionality may alternatively be implemented in hardware, firmware, or as a system on a chip (SoC).

The memory 716 may include at least one operating system (OS) module 718. The OS module 718 is configured to manage hardware resource devices such as the I/O interfaces 710, the I/O devices 714, the communication interfaces 708, and provide various services to applications or modules executing on the processors 704. The OS module 718 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 716 may be a data store 720 and one or more of the following modules. These modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including other servers 124, network attached storage devices, and so forth.

A communication module 722 may be configured to establish communications with one or more of the carts 524, sensors 512, display devices 612(3), other servers 124, or other devices. The communications may be authenticated, encrypted, and so forth.

The memory 716 may store the facility management module 190. The facility management module 190 is configured to provide the functions as described herein. For example, the facility management module 190 may track items 116 between different inventory locations 114, to and from the carts 524, generate restocking orders, direct operation of robots within the facility 102, use the identification data 134 to associate a particular user identity with a user 118 in the facility 102, and so forth. During operation, the facility management module 190 may access sensor data such as one or more of image data 136 from the cameras 112, weight data from the weight sensors 512(1), and so forth.

Information used by the facility management module 190 may be stored in the data store 720. For example, the data store 720 may be used to store physical layout data 724, sensor data 726, identification data 134, user location data 146, interaction data 728, and so forth. The sensor data 726 may comprise information obtained from one or more of the sensors 512 in or associated with the facility 102.

The physical layout data 724 may provide information indicative of where scanners 110, cameras 112, weight sensors 512(1), antennas for the radio receivers 512(3), inventory locations 114, and so forth are in the facility 102 with respect to one another. For example, the physical layout data 724 may comprise information representative of a map or floor plan of the facility 102 with relative positions of gates with scanners 110 and inventory locations 114.

The facility management module 190 may generate interaction data 728 that is indicative of an interaction, such as a pick of an item 116 from the inventory location 114, a place of an item 116 to the inventory location 114, a touch made to an item 116 at the inventory location 114, a gesture associated with an item 116 at the inventory location 114, and so forth. The interaction data 728 may include one or more of the type of interaction, interaction location identifier indicative of where from the inventory location 114 the interaction took place, item identifier, quantity change to the item 116, user identifier 144, and so forth. The interaction data 728 may then be used to update item data, associate a charge with a particular account, and so forth. For example, if the user 118 picks an item 116 and removes it from the facility 102, a payment account associated with that user 118 may be charged. The group data 188 may be used to associate interaction data 728 of one user 118 with an another. For example, if the users 118(2) and 118(3) are grouped together, an interaction such as a pick of the item 116 by the user 118(3) may be charged to the payment account associated with the user 118(2).

The facility management module 190 may use the sensor data 726 to generate the interaction data 728. The interaction data 728 may include information about the type of item 116 involved, quantity involved, whether the interaction was a pick or place, and so forth. Interactions may include the user 118 picking an item 116 from an inventory location 114, placing an item 116 at the inventory location 114, touching an item 116 at the inventory location 114, rummaging through items 116 at the inventory location 114, and so forth. For example, the facility management module 190 may generate interaction data 728 that indicates what item 116 the user 118 picked from a particular lane on a shelf, and then use this interaction data 728 to adjust the count of inventory stowed at that lane. The interaction data 728 may then be used to bill an account associated with the user identifier 144 that is associated with the user 118 who picked the item 116.

The facility management module 190 may process the sensor data 726 and generate output data. For example, based on the interaction data 728, a quantity of a type of item 116 at a particular inventory location 114 may drop below a threshold restocking level. The system may generate output data comprising a restocking order indicative of the inventory location 114, the area, and a quantity needed to replenish stock to a predetermined level. The restocking order may then be used to direct a robot to restock that inventory location 114.

Other modules 730 may also be present in the memory 716 as well as other data 732 in the data store 720. For example, a billing module may use the interaction data 728 and the identification data 134 to bill an account associated with a particular user 118, or a user 118 in the same group as indicated by the group data 188.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method comprising:
   determining, at a first time, identification data associated with a portal to a facility;
   determining a first set of users at the portal, wherein the first set of users comprises a first user and a second user;
   determining time data indicative of:
      a first crossing time of the first user at the portal, and
      a second crossing time of the second user at the portal;
   determining distance data indicative of:
      a first distance, relative to the portal, of the first user during a first time interval, and
      a second distance, relative to the portal, of the second user during the first time interval; and
   determining, based at least in part on the time data and the distance data, group data indicative of whether the first user is associated with the second user, wherein the determining the group data comprises:
      determining the first distance by:
         determining a plurality of locations of the first user during the first time interval, and
         determining a plurality of distance values, each distance value indicative of a distance between one of the plurality of locations and the portal,
      wherein the first distance is a mean of the plurality of distance values;
      determining a third distance comprising a maximum distance of the plurality of distance values;
      determining that the first user is in a second set of users based on one or more of:
         the first distance being less than a first distance threshold, or
         the third distance being less than a second distance threshold;
      determining that the first crossing time is after the second crossing time;
      determining that the first user is in a fourth set of users; and
      determining that the fourth set of users are associated with the first user.

2. The method of claim 1, the identification data comprising one or more of:
   biometric data associated with a user,
   first data represented by a machine-readable code, or
   second data transmitted by a radio transmitter.

3. The method of claim 1, wherein the first time interval begins at the later of the first crossing time or the second crossing time.

4. The method of claim 1, wherein:
   the group data is indicative of the first user being associated with the second user.

5. The method of claim 1, the determining the group data comprising:
   determining a fourth distance comprising:
      determining a second plurality of locations of the second user during the first time interval; and
      determining a second plurality of distance values, each distance value indicative of a distance between one of the second plurality of locations and the portal;
      wherein the fourth distance is a mean of the second plurality of distance values;
   determining a fifth distance comprising a maximum distance of the second plurality of distance values;
   determining that the second user is in a third set of users based on one or more of:
      the fourth distance being less than a third distance threshold, or
      the fifth distance being less than a fourth distance threshold;
   determining that the first set of users differs from the third set of users; and
   determining the third set of users are associated with the first user.

6. The method of claim 5, the determining the third set of users are associated with the first user comprising:
   determining, using a first classifier, a first confidence value that is indicative of a likelihood that the second user in the third set of users is not grouped with the first user;
   determining the first confidence value is less than a first confidence threshold;
   responsive to the first confidence value being less than the first confidence threshold, determining that the second crossing time is outside a second time interval, wherein the second time interval begins at the first time;
   determining, using a second classifier, a second confidence value that is indicative of a likelihood that the second user in the third set of users is grouped with the first user; and
   determining the second confidence value is greater than a second confidence threshold.

7. The method of claim 1, the determining the group data comprising:
   determining a fourth distance comprising:
      determining a second plurality of locations of the second user during the first time interval; and
      determining a second plurality of distance values, each distance value indicative of a distance between one of the second plurality of locations and the portal;
      wherein the fourth distance is a mean of the second plurality of distance values;
   determining a fifth distance comprising a maximum distance of the second plurality of distance values;
   determining that the second user is in a third set of users based on one or more of:
      the fourth distance being less than a third distance threshold, or
      the fifth distance being less than a fourth distance threshold;
   determining that the first set of users differs from the third set of users;
   determining, using a first classifier, a first confidence value that is indicative of a likelihood that the second user in the third set of users is not grouped with the first user;
   determining the first confidence value is less than a first confidence threshold;
   responsive to the first confidence value being less than the first confidence threshold, determining that the second crossing time is outside a second time interval, wherein the second time interval begins at the first time;
   determining, using a second classifier, a second confidence value that is indicative of a likelihood that the second user in the third set of users is grouped with the first user; and
   determining the second confidence value is less than a second confidence threshold;
   wherein the group data indicates that the second user in the third set of users is not associated with the first user.

8. The method of claim 1, the determining the group data comprising:
   determining a fourth distance comprising:
      determining a second plurality of locations of the second user during the first time interval; and
      determining a second plurality of distance values, each distance value indicative of a distance between one of the second plurality of locations and the portal;
      wherein the fourth distance is a mean of the second plurality of distance values;
   determining a fifth distance comprising a maximum distance of the second plurality of distance values;
   determining that the second user is in a third set of users based on one or more of:
      the fourth distance being less than a third distance threshold, or
      the fifth distance being less than a fourth distance threshold;
   determining that the first set of users is the same as the third set of users; and
   determining that the third set of users are associated with the first user.

9. A computer implemented method comprising:
   determining, at a first time, identification data associated with a portal to a facility;
   determining a first set of users at the portal, wherein the first set of users comprises a first user and a second user;
   determining time data indicative of individual users in the first set of users passing a border of the portal to enter the facility, wherein the time data comprises:
      a first crossing time of the first user, and
      a second crossing time of the second user;
   determining distance data indicative of the individual users in the first set of users with respect to the portal, wherein the determining the distance data comprises:
      determining a first distance by:
         determining a first plurality of locations of the first user during a first time interval, and
         determining a first plurality of distance values, each distance value indicative of a distance between one of the first plurality of locations and the portal, wherein the first distance is a mean of the first plurality of distance values; and
      determining a second distance comprising a maximum distance of the first plurality of distance values; and
   determining, based at least in part on the time data and the distance data, group data indicative of whether the first user is associated with the second user, wherein the determining the group data comprises:
      determining that the first user is in a second set of users based on one or more of:
         the first distance being less than a first distance threshold, or the second distance being less than a second distance threshold;
determining that the first crossing time is after the second crossing time;
determining that the first user is in a fourth set of users; and
determining that the fourth set of users are associated with the second user.

10. The method of claim 9, the identification data comprising one or more of:
biometric data associated with a user,
first data represented by a machine-readable code, or
second data transmitted by a radio transmitter.

11. The method of claim 9, the determining the distance data indicative of the individual users in the first set of users with respect to the portal comprising:
determining, for each user in the first set of users, a crossing time;
determining a latest crossing time from the crossing times of the first set of users; and
determining, for each user in the first set of users, a distance relative to the portal during a time interval that begins at the latest crossing time.

12. The method of claim 9, wherein:
the group data is indicative of the first user being associated with the second user.

13. The method of claim 9, wherein the determining the group data further comprising:
determining that the second user is in a third set of users;
determining that the first set of users differs from the third set of users; and
determining that the third set of users are associated with the first user.

14. The method of claim 13, the determining the third set of users are associated with the first user comprising:
determining, using a first classifier, a first confidence value that is indicative of a likelihood that the second user in the third set of users is not grouped with the first user;
determining the first confidence value is less than a first confidence threshold;
responsive to the first confidence value being less than the first confidence threshold, determining that the second crossing time is outside a second time interval, wherein the second time interval begins at the first time;
determining, using a second classifier, a second confidence value that is indicative of a likelihood that the second user in the third set of users is grouped with the first user; and
determining the second confidence value is greater than a second confidence threshold.

15. The method of claim 9, the determining the group data comprising:
determining that the second user is in a third set of users;
determining that the first set of users differs from the third set of users;
determining, using a first classifier, a first confidence value that is indicative of a likelihood that the second user in the third set of users is not grouped with the first user;
determining the first confidence value is less than a first confidence threshold;
responsive to the first confidence value being less than the first confidence threshold, determining that a third crossing time is outside a second time interval, wherein the second time interval begins at the first time;
determining, using a second classifier, a second confidence value that is indicative of a likelihood that the second user in the third set of users is grouped with the first user; and
determining the second confidence value is less than a second confidence threshold;
wherein the group data indicates that the second user in the third set of users is not associated with the first user.

16. The method of claim 9, the determining the group data comprising:
determining a third distance comprising:
determining a second plurality of locations of the second user during the first time interval; and
determining a second plurality of distance values, each distance value indicative of a distance between individual ones of the second plurality of locations and the portal;
wherein the third distance is a mean of the second plurality of distance values;
determining a fourth distance comprising a maximum distance of the second plurality of distance values;
determining that the second user is in a third set of users based on one or more of:
the third distance being less than a third distance threshold, or
the fourth distance being less than a fourth distance threshold;
determining that the first set of users is the same as the third set of users; and
determining that the third set of users are associated with the first user.

17. A system comprising:
a portal to a facility; and
a first computing device to:
determine a first set of users at the portal, wherein the first set of users comprises
a first user and a second user;
determine:
a first crossing time of the first user at the portal,
a first distance, relative to the portal, of the first user during a first time interval,
a second crossing time of the second user at the portal, and
a second distance, relative to the portal, of the second user during the first time interval;
determine first identification data at a first time; and
determine group data indicative of whether the first user is associated with the second user, wherein the group data is determined by:
determining the first distance by:
determining a first plurality of locations of the first user during the first time interval, and
determining a first plurality of distance values, each distance value indicative of a distance between one of the first plurality of locations and the portal,
wherein the first distance is a mean of the first plurality of distance values;
determining a third distance comprising a maximum distance of the first plurality of distance values;
determining that the first user is in a second set of users based on one or more of:
the first distance being less than a first distance threshold, or
the third distance being less than a second distance threshold;
determining that the first crossing time is after the second crossing time;

determining that the first user is in a fourth set of users; and determining that the fourth set of users are associated with the first user.

18. The system of claim 17, the first computing device further to:

determine the first user and the second user are associated with the first identification data.

\* \* \* \* \*

UNITED STATES PATENT AND TRADEMARK OFFICE
CERTIFICATE OF CORRECTION

PATENT NO. : 12,148,259 B1
APPLICATION NO. : 17/304128
DATED : November 19, 2024
INVENTOR(S) : Hue Tuan Thi et al.

Page 1 of 1

It is certified that error appears in the above-identified patent and that said Letters Patent is hereby corrected as shown below:

In the Claims

Column 24, Claim 1, Line 36:
Currently reads: "determining a plurality of locations of the first user"
When it should read: -- determining a first plurality of locations of the first user --

Column 24, Claim 1, Line 38:
Currently reads: "determining a plurality of distance values,"
When it should read: -- determining a first plurality of distance values, --

Column 24, Claim 1, Line 40:
Currently reads: "one of the plurality of locations and the portal,"
When it should read: -- one of the first plurality of locations and the portal, --

Column 24, Claim 1, Line 41:
Currently reads: "wherein the distance is a mean of the first plurality,"
When it should read: -- wherein the first distance is a mean of the first plurality, --

Column 24, Claim 1, Line 44:
Currently reads: "distance of the plurality of distance values,"
When it should read: -- distance of the first plurality of distance values, --

Signed and Sealed this
Twenty-fourth Day of December, 2024

Derrick Brent
*Acting Director of the United States Patent and Trademark Office*